Oct. 19, 1937.  J. W. WHITE  2,096,219
BRAKE
Filed Oct. 23, 1933  2 Sheets-Sheet 1
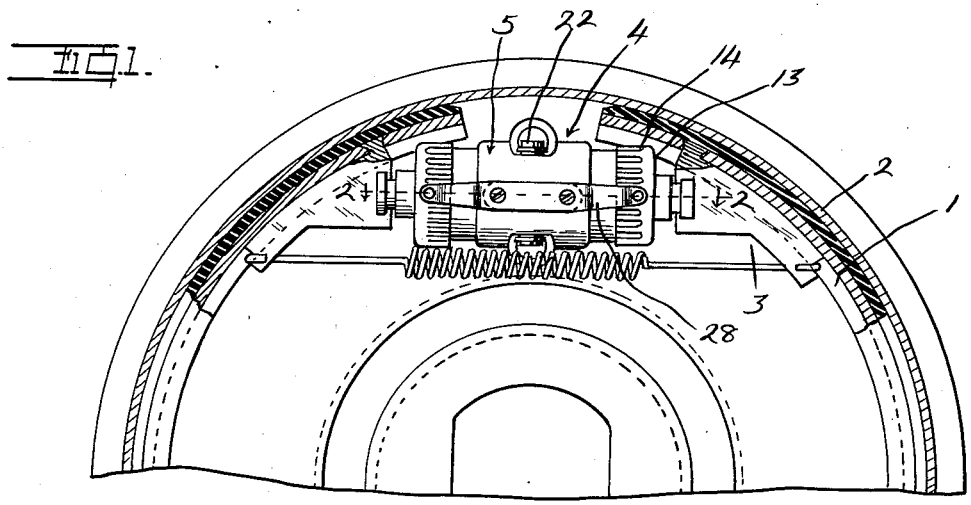
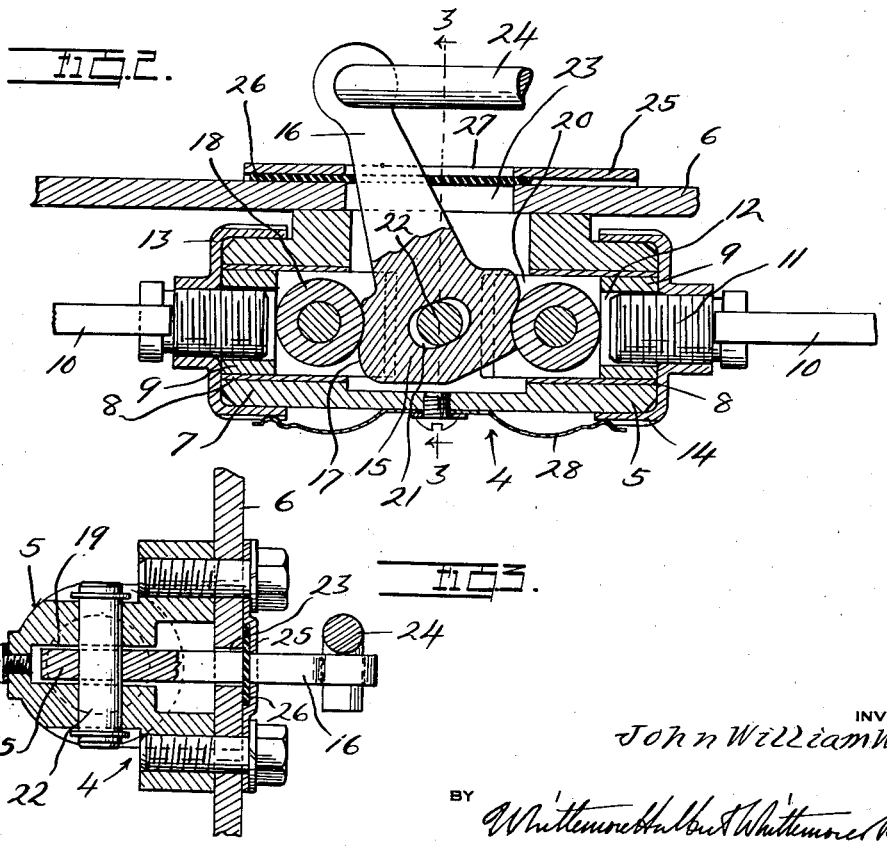
INVENTOR
John William White Oct. 19, 1937.  J. W. WHITE  2,096,219
BRAKE
Filed Oct. 23, 1933   2 Sheets-Sheet 2

INVENTOR
John William White

Patented Oct. 19, 1937

2,096,219

UNITED STATES PATENT OFFICE 2,096,219

BRAKE

John William White, Detroit, Mich., assignor to Kelsey-Hayes Wheel Company, Detroit, Mich., a corporation of Delaware Application October 23, 1933, Serial No. 694,870

16 Claims. (Cl. 188—78)

The invention relates to brakes and refers more particularly to mechanical actuators for brake shoes.

The invention has for one of its objects to provide an improved mechanical actuator so constructed and arranged that it operates with but little friction loss. Another object is to provide a mechanical actuator constructed to exert a substantially equalized spreading effort upon relatively movable parts of a brake shoe. A further object is to so form the mechanical actuator that it is simple in construction and may be manufactured at relatively low cost.

These and other objects of the invention will become apparent from the following description, taken in connection with the accompanying drawings, in which Figure 1 is a sectional side elevation of a brake mechanism showing an embodiment of my invention;

Figure 2 is a cross section on the line 2—2 of Figure 1;

Figure 3 is a cross section on the line 3—3 of Figure 2;

Figure 4:
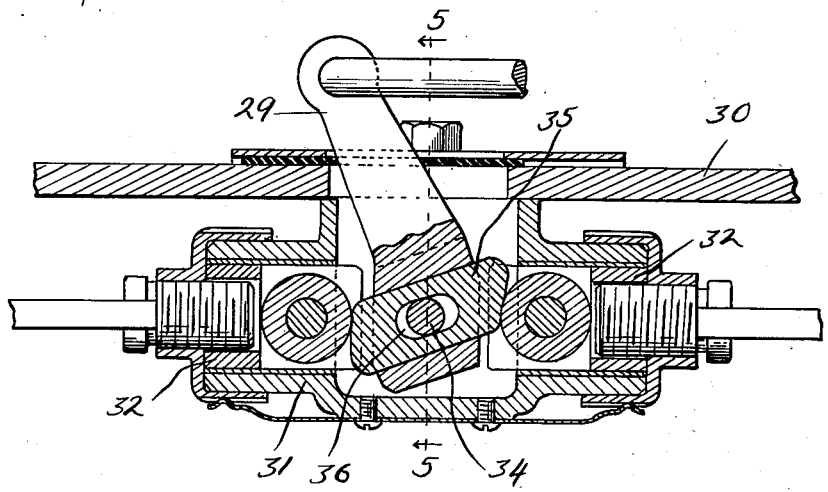
Figure 4 is a view similar to Figure 2 showing another embodiment of my invention.

My brake mechanism is designed particularly for use with motor vehicles and, as shown, comprises the brake shoe 1 within and engageable with the annular flange of the brake drum 2 and means associated with the brake shoe for actuating the same. The brake shoe has the relatively movable parts 3 and, as illustrated in the present instance, is in the form of a flexible band having the end portions constituting the parts 3.

Referring more particularly to Figure 1, 2, and 3, 4 is the actuator located between the parts 3. This actuator comprises the support 5, which is mounted on the brake carrier 6. This support is in the nature of a housing member having the axially aligned cylindrical end portions 7 which are preferably provided with the hardened cylindrical bushings 8. 9 are plungers slidable in the bushings. Each plunger is operatively connected to the adjacent part 3 of the brake shoe by means of the bracket 10 upon the part 3, the screw 11 slotted at its outer end to receive the bracket and freely engaging at its inner end the axial recess or bore 12 in the plunger, and the nut 13 which is threaded upon the screw and abuts the outer end of the plunger. This nut has the annular portion 14 encircling the end portion 7 and preferably provided with a roughened or corrugated outer face to facilitate rotation of the nut to enable securing a predetermined clearance between the brake shoe and the annular flange of the brake drum when the brake shoe is in retracted position.

The actuator also comprises the floating hub member 15 and the lever 16 integral with this hub member. The hub member is located between the plungers 9 and has the opposite cam faces 17 which are engageable with the rollers 18 journalled at the inner ends of the plungers and which are shaped so that upon angular movement of the lever 16 and consequent angular movement of the hub member in the direction indicated by the arrow in Figure 2 the plungers are compelled to move outwardly, thereby spreading apart the parts 3 of the brake shoe and forcing the latter into frictional engagement with the annular flange of the brake drum. The support or housing member intermediate its end portion 7 is formed with the relatively narrow recess 19 between the side walls of which the hub member 15 extends. As a result, these side walls guide the hub member. The inner ends of the plungers are slotted at 20 to receive the portions of the hub member having the cam faces 17 and as a result the plungers are held from rotation. The rollers 18 are located in the slots of the plungers. The hub member 15 is provided with the slot or elongated opening 21 therethrough, the longitudinal axis of this slot or opening being parallel to the longitudinal axis of the hub member and at right angles to the longitudinal axis of the lever 16. 22 is a pin extending through the portion of the support or housing member between the plungers and through the slot or elongated opening 21. The axis of this pin is preferably in alignment with the axes of the plungers. This arrangement provides for pivotally connecting the hub member and lever to the support or housing member and at the same time provides for relative bodily movement of the hub member and lever so that substantially equalized spreading effort is exerted upon the relatively movable parts 3 of the brake shoe.

The lever and hub member are horizontal and the lever extends transversely through the carrier 6, the latter being provided with the opening 23 which provides for the required angular movement of the lever. The outer end of this lever is connected to the tension member 24 which is operated from the brake pedal.

For closing the opening 23 so that liquid, dust and the like cannot pass therethrough into the actuator I have provided the dust cover 25 secured to the outer side of the carrier 6 and the dust slide 26 which is located between the cover and the carrier and guided thereby. The cover is provided with the elongated opening 27 providing for the required angular movement of the lever and the slide is provided with an opening of a size to fit the lever. This slide is formed of yieldable material, preferably rubber, so that it maintains tight engagement with the sides of the lever at all times.

28 is a suitable spring which is secured intermediate its ends to the support or housing member 5 and which has its ends resiliently engaging the roughened or corrugated faces of the nuts 13 to normally hold the latter in their positions of rotative adjustment.

With the above construction it will be readily seen that the brake shoe is actuated with but very little friction loss, since the tension member connected to the brake pedal is directly connected to the lever of the actuator and this lever extends into the support or housing member of the actuator and is directly pivotally connected thereto by a pin which is relatively small since it does not take any of the brake applying load. By reason of the pin being relatively small, the friction loss between this pin and the hub member or lever is slight. It will also be seen that the arrangement is such that the lever and hub member have bodily movement relative to the support or housing member of the actuator so that the spreading effort exerted upon the relatively movable parts of the brake shoe is substantially equalized. Furthermore, the longitudinal axis of the lever is inclined rearwardly to the line passing through the pin and extending at right angles to the axis passing through the end portions of the support or housing member when this lever is in its normal or retracted position, so that when this lever is swung forwardly through its tension member the effort initially exerted upon the leading end or part of the brake shoe (the right hand part in Figure 1) is greater than that exerted upon the trailing part, which is desirable.

Figure 5:
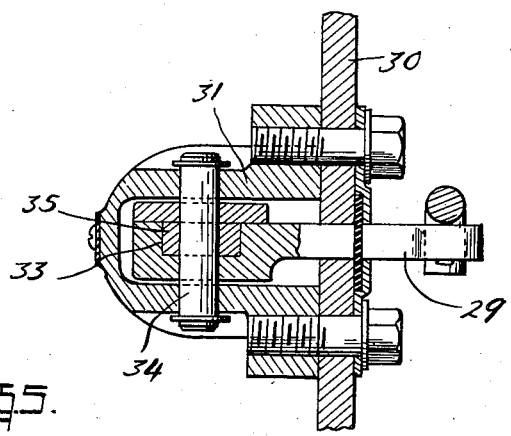
Figure 5 is a cross section on the line 5—5 of Figure 4.

In the construction shown in Figures 4 and 5, the parts, with the exception of those for actuating the plungers, have the same general arrangement as those shown in Figures 1, 2 and 3. In this modification, 29 is the lever which extends horizontally and transversely through the carrier 30 and into the support or housing member 31 of the actuator and between the plungers 32. The hub portion of this lever is of greater thickness than the portion extending outwardly through the carrier and it is provided with the slot 33 which is substantially at right angles to the line connecting the axis of the eye at the outer end of the lever and the axis of the securing pin 34. The axis of the securing pin is substantially in alignment with the axes of the plungers. 35 is a cam slidably engaging this slot and having the end cam faces engageable with the rollers at the inner ends of the plungers. This cam is provided with the longitudinally extending slot or elongated opening 36 through which the pin 34 extends. With this arrangement it will be seen that the lever 29 is journalled upon the pin 34 and is adapted to directly actuate the cam. It will also be seen that the cam is bodily movable so that it will exert substantially equal pressures upon the plungers to spread the same apart.

What I claim as my invention is:

1. In brake mechanism, the combination with a brake carrier and a brake shoe having relatively movable parts, of an actuator mounted on said carrier, comprising a support, reciprocable members on said support, a lever pivotally connected directly to said support and extending between said reciprocable members, and a floating cam upon said lever engaging said reciprocable members and mounted for limited displacement bodily relative to the support.

2. In brake mechanism, the combination with a brake carrier and a brake shoe having relatively movable parts, of an actuator mounted on said carrier comprising a housing member, plungers reciprocable within said housing member, and a floating lever pivotally connected directly to said housing member for limited displacement bodily relative to the support and having cam faces engaging said plungers.

3. In brake mechanism, the combination with a brake carrier and a brake shoe having relatively movable parts, of an actuator mounted on said carrier comprising a housing between said relatively movable parts, plungers reciprocable in said housing, a lever extending transversely through said carrier into said housing and having a slotted hub member provided with cam faces for engaging said plungers, and a pin upon said housing and extending through the slot of said hub member for connecting said lever to said housing and providing for bodily movement of said lever relative to said housing.

4. In brake mechanism, the combination with a brake carrier and a brake shoe having relatively movable parts, of an actuator mounted on said carrier comprising a housing between said relatively movable parts, plungers reciprocable in said housing, a lever extending transversely through said carrier into said housing between said plungers, a cam carried by said lever and movable transversely thereof and having cam faces engageable with said plungers, said cam having a longitudinal slot therethrough and a pin upon said housing extending through said lever and the slot of said cam for connecting said lever to said housing and providing for bodily movement of said cam relative to said housing.

5. In brake mechanism, the combination with a brake carrier and a brake shoe having relatively movable parts, of an actuator mounted on said carrier, comprising a lever extending transversely through said carrier, a cover upon said carrier, and a slide having an opening through which said lever extends, said slide being located between said carrier and cover and being movable with said lever.

6. In brake mechanism, the combination with a brake carrier and a brake shoe having relatively movable parts, of an actuator mounted on said carrier comprising a support, and means on said support for spreading apart said relatively movable parts, comprising a lever extending through said carrier and arranged to be directly connected at its outer end to a tension member, and a pin pivotally connecting said lever to said support and permitting shifting movement of the lever in a direction substantially circumferentially of the brake shoe.

7. In brake mechanism, the combination with a brake carrier and a brake shoe having relatively movable parts, of an actuator mounted on said carrier comprising a support and means on said support for exerting substantially equal spreading pressure upon said relatively movable parts, comprising a lever extending through said carrier and arranged to be directly connected at its outer end to a tension member, and a pin pivotally connecting said lever to said support and extending through a slot in said lever elongated in a direction to afford shifting movement of the lever in a direction substantially circumferentially of the brake shoe.

8. In brake mechanism, the combination with a brake carrier and a brake shoe having relatively movable parts, of an actuator mounted on said carrier and comprising a support, a floating member for exerting substantially equal spreading pressure upon said relatively movable parts, a lever extending through said carrier and arranged to be directly connected at its outer end to a tension member, said lever directly actuating said floating member, and a relatively small pin pivotally connecting said floating member and lever to said support and providing for floating action of said floating member whereby said pin is free of the brake applying load.

9. In brake mechanism, the combination with a brake carrier and a brake shoe having relatively movable parts, of an actuator mounted on said carrier and comprising a support, reciprocable members upon said support, a floating member having cam faces engageable with said reciprocable member for actuating the same, a lever extending through said carrier and arranged to be directly connected at its outer end to a tension member, said lever directly actuating said floating member, and a relatively small pin pivotally connecting said floating member and lever to said support and providing for floating action of said floating member, whereby said pin is free of the brake applying load.

10. In brake mechanism, the combination with a brake carrier and a brake shoe having relatively movable parts, of an actuator mounted on the carrier comprising a support, plungers reciprocably mounted upon the support, and a lever pivotally mounted between the plungers for swinging movement about an axis extending transverse to the direction of reciprocation of the plungers and also for limited displacement bodily relative to the support and having cam faces engaging said plungers.

11. In brake mechanism, the combination with a brake carrier and a brake shoe having relatively movable parts, of an actuator mounted on the carrier and comprising a support, reciprocable members on the support, and a pin pivotally supporting the floating lever on the carrier between the reciprocable members for displacement bodily relative to the pin in a direction substantially circumferentially of the brake shoe and having cam faces engaging the reciprocable members.

12. In brake mechanism, the combination with a brake carrier and a brake shoe having relatively movable parts, of an actuator mounted on the carrier and comprising a support, means upon the support for spreading apart the relatively movable parts including a floating lever mounted between the parts for swinging movement about an axis extending transverse to the direction of relative movement of the parts, said lever also mounted for limited displacement bodily in opposite directions relative to the support in a direction substantially circumferentially of the brake shoe and having cam faces for actuating the relatively movable parts.

13. In brake mechanism, the combination with a brake carrier and a brake shoe having relatively movable parts, of an actuator mounted on said carrier and comprising a support, and means upon said support for spreading apart said relatively movable parts including a floating lever pivotally connected directly to the support for limited displacement bodily relative to the support in a direction substantially circumferentially of the brake shoe and having cam faces for actuating the relatively movable parts.

14. In brake mechanism, the combination with a brake carrier and a brake shoe having relatively movable parts, of an actuator mounted on said carrier and comprising a support, and means for spreading apart said relatively movable parts including a floating lever pivotally mounted on a pin carried by the support and shiftable bodily relative to the pin in a direction substantially circumferentially of the brake shoe and having cam faces for actuating said parts.

15. In brake mechanism, the combination with a brake carrier and brake friction means having relatively movable parts, of means for spreading apart said relatively movable parts including a lever extending transversely through the carrier and having cam faces at the inner end thereof positioned between the movable parts for engagement with the latter, and a member free of the brake applying load exerted by the member and pivotally supporting said lever on the carrier for swinging movement in a plane transverse to the plane of the carrier.

16. In brake mechanism, the combination with a brake carrier and brake friction means having relatively movable parts, of a lever extending transversely through the carrier and having cam portions at the inner end thereof positioned between the movable parts for engagement with the latter, and means supporting the inner end of the lever on the carrier for swinging movement in a plane extending transverse to the plane of the carrier and for circumferential shifting movement relative to the carrier, said means being free of the brake applying load exerted by said lever.

JOHN WILLIAM WHITE.